United States Patent
Kiyoto et al.

(10) Patent No.: US 12,043,443 B2
(45) Date of Patent: Jul. 23, 2024

(54) PREFORM AND SYNTHETIC RESIN CONTAINER

(71) Applicant: TOYO SEIKAN CO., LTD., Tokyo (JP)

(72) Inventors: Hiromitsu Kiyoto, Yokohama (JP); Hajime Inagaki, Yokohama (JP); Hideto Monzen, Yokohama (JP); Hiroki Yasukawa, Yokohama (JP)

(73) Assignee: TOYO SEIKAN CO., LTD., Tokyo (JP)

( * ) Notice: Subject to any disclaimer, the term of this patent is extended or adjusted under 35 U.S.C. 154(b) by 126 days.

(21) Appl. No.: 17/295,078

(22) PCT Filed: Nov. 13, 2019

(86) PCT No.: PCT/JP2019/044452
§ 371 (c)(1),
(2) Date: May 19, 2021

(87) PCT Pub. No.: WO2020/116105
PCT Pub. Date: Jun. 11, 2020

(65) Prior Publication Data
US 2022/0017258 A1    Jan. 20, 2022

(30) Foreign Application Priority Data
Dec. 4, 2018  (JP) .................................. 2018-227334

(51) Int. Cl.
*B65D 1/40*    (2006.01)
*B29C 49/06*   (2006.01)
(Continued)

(52) U.S. Cl.
CPC ............. *B65D 1/40* (2013.01); *B65D 1/0215* (2013.01); *B29C 49/06* (2013.01); *B29C 49/22* (2013.01);
(Continued)

(58) Field of Classification Search
CPC ........ B29C 2949/30; B29C 2949/3016; B29C 2949/302; B29C 2949/3048; B65D 1/0215; B65D 1/40
See application file for complete search history.

(56) References Cited

U.S. PATENT DOCUMENTS

2009/0220717 A1 * 9/2009 Wilczak .................. C08J 7/043
                                                    427/508
2019/0375547 A1    12/2019 Suga et al.

FOREIGN PATENT DOCUMENTS

JP        11-90975 A     4/1999
JP     2002-361717 A    12/2002
(Continued)

OTHER PUBLICATIONS

International Search Report dated Dec. 17, 2019 from the International Searching Authority in International Application No. PCT/JP2019/044452.
(Continued)

*Primary Examiner* — Andrew T Kirsch
(74) *Attorney, Agent, or Firm* — Sughrue Mion, PLLC (57) ABSTRACT

Provided are a preform for manufacturing a synthetic resin container, in which a decorative layer (60) having three-dimensional design different from the conventional one is formed on the surface of a container main body (10a), and a synthetic resin container. In a preform (1) including a preform main body (1a) of a bottomed cylindrical shape that is opened to have a mouth portion (2) on one end side thereof, and a covering layer (6) configured to cover the preform main body (1a) except for a part thereof on a mouth portion (2) side, and a container (10) obtained by subjecting the preform to blow molding, a distal end side of the covering layer (6) (decorative layer (60)) is formed so as to reach a peripheral end edge of a neck ring (22) while covering a lower surface of the neck ring (22) that is
(Continued)

provided on a lower end side of the mouth portion (2) and protrudes annularly along a circumferential direction.

8 Claims, 8 Drawing Sheets

(51) Int. Cl.
*B29L 31/00* (2006.01)
*B65D 1/02* (2006.01)
*B29C 49/22* (2006.01)
*B29K 701/12* (2006.01)

(52) U.S. Cl.
CPC .. *B29C 2949/20* (2022.05); *B29C 2949/3016* (2022.05); *B29C 2949/3032* (2022.05); *B29K 2701/12* (2013.01); *B29L 2031/7158* (2013.01)

(56) References Cited

FOREIGN PATENT DOCUMENTS

| JP | 2007-230579 A | 9/2007 |
| JP | 2007-532363 A | 11/2007 |
| JP | 2015-198908 A | 11/2015 |
| JP | 2018-188190 A | 11/2018 |
| WO | 2005/102668 A2 | 11/2005 |

OTHER PUBLICATIONS

International Preliminary Report with translation of the Written Opinion on Patentability dated Jun. 8, 2021 from the International Bureau in International Application No. PCT/JP2019/044452.

\* cited by examiner

PREFORM AND SYNTHETIC RESIN CONTAINER

CROSS-REFERENCE TO RELATED APPLICATIONS

This application is a National Stage of International Application No. PCT/JP2019/044452 filed Nov. 13, 2019, which claims priority under U.S.C. § 119(a) to Japanese Patent Application No. JP 2018-227334 filed on Dec. 4, 2018.

TECHNICAL FIELD

The present invention relates to a preform for manufacturing a synthetic resin container in which a decorative layer having three-dimensional design different from the conventional one is formed on the surface of a container main body, and to a synthetic resin container obtained by subjecting the preform to blow molding.

BACKGROUND ART

There has hitherto been known, as a beverage container for containing various beverages as contents, a synthetic resin container obtained by forming a preform through use of a synthetic resin, such as polyethylene terephthalate, and then molding the preform into a bottle shape by stretch blow molding or the like.

This type of container has a content filled and sealed therein, and is usually put on the market under a state in which a label having a product name, content indication, and further decorative design printed thereon is attached to the container. As such label, a shrink label to be attached by thermal shrinkage, a seal label to be attached with an adhesive, and the like have been known (see, for example, Patent Literature 1).

CITATION LIST

Patent Literature

Patent Literature 1: JP 2007-230579 A

SUMMARY OF INVENTION

Technical Problem

Incidentally, in the recent situation in which the use of this type of container has become more common in a wide range of fields, in order to differentiate this type of container from other products, there is an increasing demand for a product excellent in designability with design features.

However, in the case of the container having the label as described above attached thereto, even when printing is performed on the label for the purpose of decoration, only flat design is given. Thus, it has been difficult to express design features three-dimensionally.

The present invention has been made in view of the above-mentioned circumstances, and an object of the present invention is to provide a preform for manufacturing a synthetic resin container in which a decorative layer having three-dimensional design different from the conventional one is formed on the surface of a container main body, and a synthetic resin container.

Solution to Problem

According to one embodiment of the present invention, there is provided a preform for manufacturing a synthetic resin container by blow molding, the preform including: a preform main body of a bottomed cylindrical shape that is opened to have a mouth portion on one end side thereof; and a covering layer configured to cover the preform main body except for a part thereof on a mouth portion side, wherein a distal end side of the covering layer reaches a peripheral end edge of a neck ring while covering a lower surface of the neck ring that is provided on a lower end side of the mouth portion and protrudes annularly along a circumferential direction.

According to another embodiment of the present invention, there is provided a synthetic resin container, which is obtained by subjecting the above-mentioned preform to blow molding, the synthetic resin container including a decorative layer having, imparted thereto, an uneven shape that is the same as and follows an uneven shape imparted to a surface of a container main body, wherein a distal end side of the decorative layer reaches a peripheral end edge of a neck ring while covering a lower surface of the neck ring that is provided on a lower end side of a mouth portion of the synthetic resin container and protrudes annularly along a circumferential direction.

Advantageous Effects of Invention

According to the present invention, the synthetic resin container having three-dimensional design different from the conventional one can be provided. When the container in which a content has been consumed is disposed of, the decorative layer can be easily peeled off from the container main body through use of, as a starting point, the distal end side of the decorative layer in the vicinity of the peripheral end edge of the neck ring, and the container main body and the decorative layer can be easily separated from each other.

DESCRIPTION OF EMBODIMENTS

Now, preferred embodiments of the present invention are described with reference to the drawings.

First Embodiment

First, a first embodiment of the present invention is described.

Figure 1:
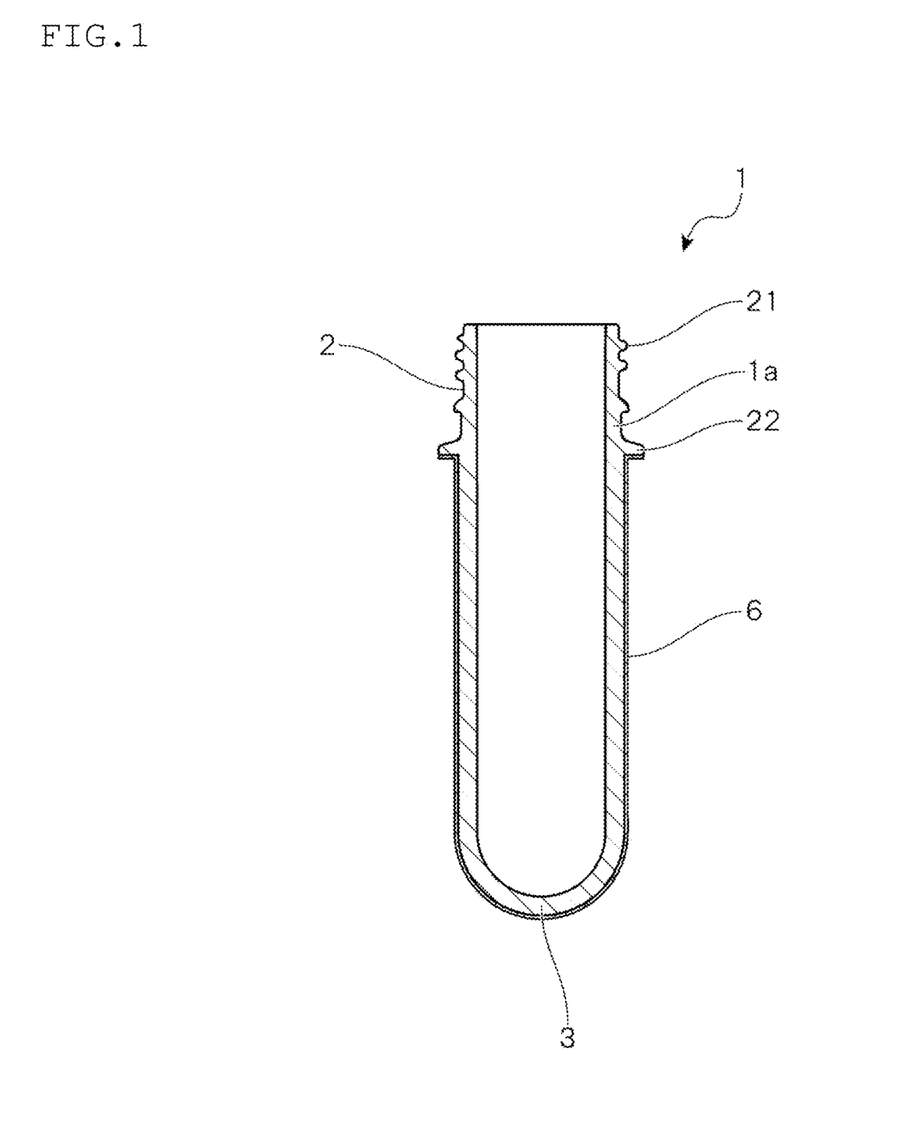
FIG. 1 is a vertical sectional view for schematically illustrating a preform according to a first embodiment of the present invention.

FIG. 1 is a vertical sectional view for schematically illustrating a preform 1 according to the first embodiment.

Figure 2:
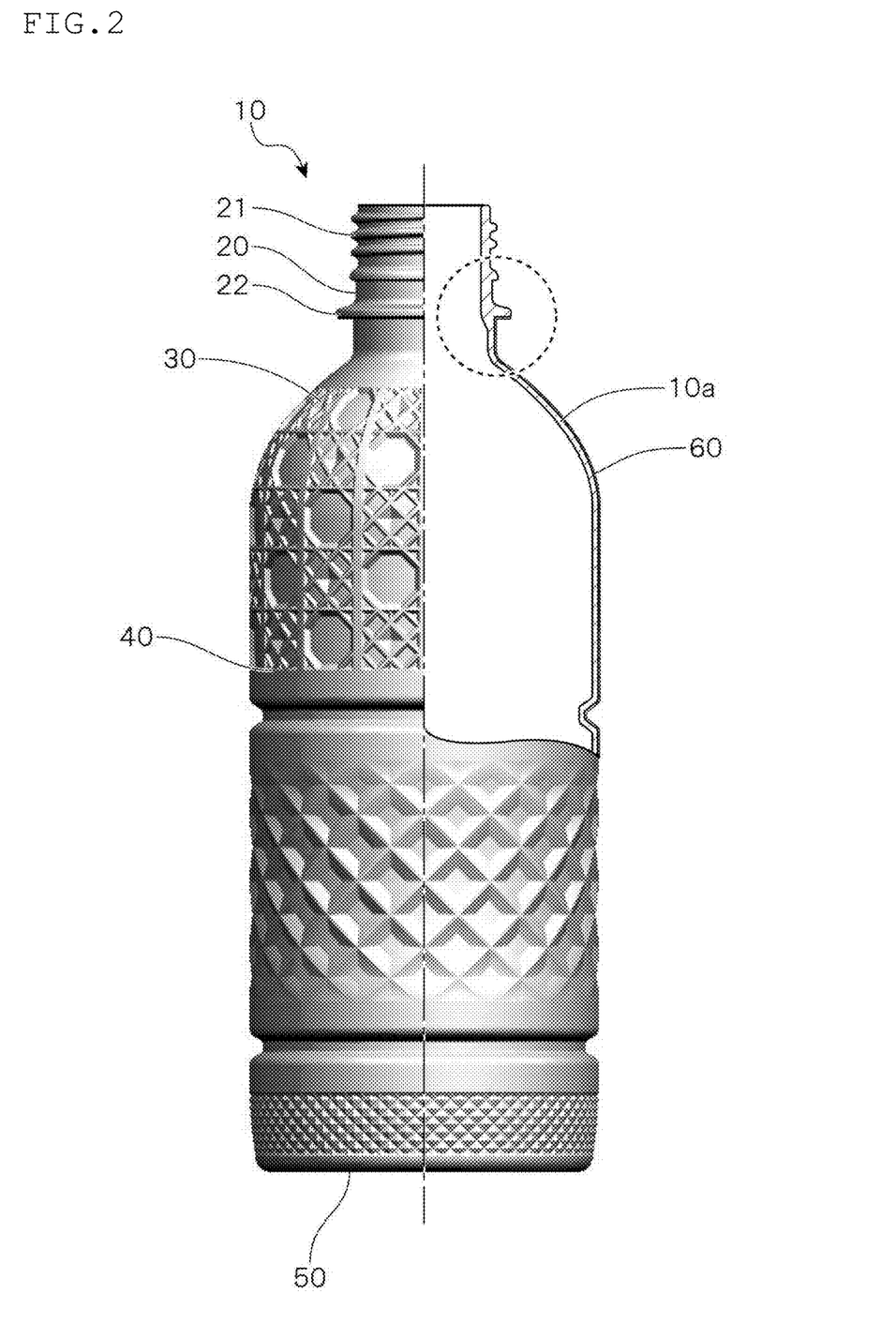
FIG. 2 is an explanatory view for schematically illustrating a synthetic resin container according to the first embodiment of the present invention.

FIG. 2 is an explanatory view for illustrating an example of a synthetic resin container obtained by subjecting the preform 1 illustrated in FIG. 1 to blow molding under a state in which a part of the synthetic resin container is cut away. A container 10 illustrated in FIG. 2 includes a mouth portion 20, a shoulder portion 30, a body portion 40, and a bottom portion 50, and also includes a decorative layer 60 configured to cover the surface of a container main body 10a except for a part thereof on a mouth portion 20 side.

Figure 3:
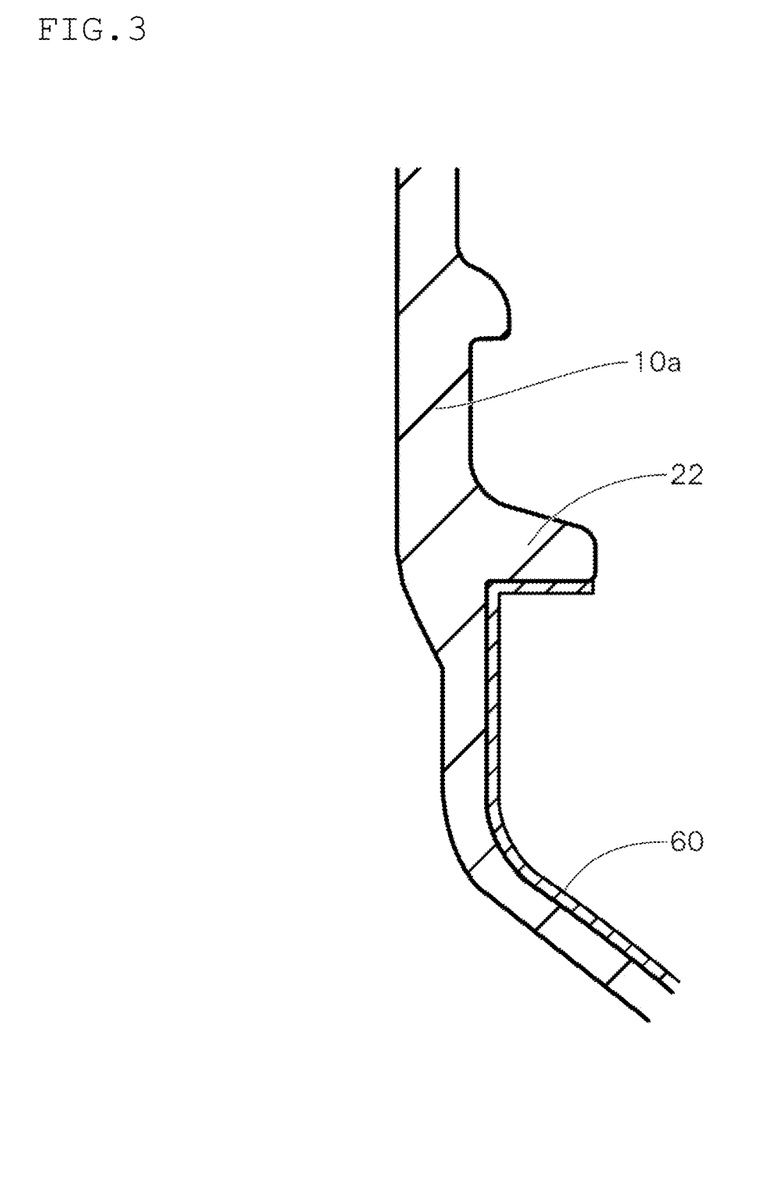
FIG. 3 is an enlarged sectional view of a main part for illustrating in an enlarged state a range surrounded by the dashed line of FIG. 2 with respect to the synthetic resin container according to the first embodiment of the present invention.

A range surrounded by the dashed line of FIG. 2 is illustrated in an enlarged state in FIG. 3.

In the first embodiment, the preform 1 includes a preform main body 1a of a bottomed cylindrical shape that is opened to have a mouth portion 2 on one end side thereof, and a covering layer 6 configured to cover the preform main body 1a except for a part thereof on the mouth portion 2 side, and the preform main body 1a is closed with the bottom portion 3 formed in a hemispherical shape on the other end side thereof.

The mouth portion 2 of the preform 1 is a region that is not stretched by blow molding and serves as the mouth portion 20 of the container 10 as it is. An outer peripheral surface of the mouth portion 2 has a screw thread 21 for attaching a cap (not shown) thereto.

In addition, a neck ring 22 that protrudes annularly along a circumferential direction is provided on a lower end side of the mouth portion 2.

The preform 1 is set in a blow molding mold (not shown). Then, a region extending from a portion immediately below the mouth portion 2 to the bottom portion 3 is stretched in an axial direction (vertical direction) if necessary by using a stretch rod and is simultaneously stretched in the axial direction and a circumferential direction (transverse direction) with blow air blown into the preform 1.

Then, the shape of an inner surface of the blow molding mold is imparted to the stretched region, and thus the container 10 having a desired container shape is molded.

Herein, in the first embodiment, in the state illustrated in FIG. 1 with the mouth portion 2 facing upward, up-and-down and right-and-left directions and vertical and horizontal directions of the preform 1 are defined. Similarly, also in the container 10, in the state illustrated in FIG. 2 in which the container 10 is erected with the mouth portion 20 facing upward, up-and-down and right-and-left directions and vertical and horizontal directions are defined.

In blow molding of the preform 1 as described above, the container main body 10a is formed by the stretched preform main body 1a, and simultaneously the covering layer 6 configured to cover the preform main body 1a is stretched integrally with the preform main body 1a to form the decorative layer 60 configured to cover the surface of the container main body 10a.

In this case, the covering layer 6 that is integrally stretched with the preform main body 1a closely adheres to the inner surface of the blow molding mold, and an uneven shape formed on the inner surface of the blow molding mold is imparted to the stretched preform main body 1a via the covering layer 6. As a result, on the surface of the container 10 obtained by subjecting the preform 1 to blow molding, there is formed the decorative layer 60 having, imparted thereto, an uneven shape that is the same as and follows an uneven shape imparted to a surface of the container main body 10a.

Thus, according to the first embodiment, the uneven shape that is the same as and follows the uneven shape imparted to the surface of the container main body 10a appears on the surface of the decorative layer 60, with the result that the container 10 having three-dimensional design different from the conventional one can be provided.

In addition, the covering layer 6 provided in the preform 1 is formed so as to cover the preform main body 1a except for a part thereof on the mouth portion 2 side. In the first embodiment, the covering layer 6 is formed so as to cover a region extending from a portion immediately below the mouth portion 2 to the bottom portion 3, that is, a region to be stretched by blow molding, and so that a distal end side of the covering layer 6 reaches a peripheral end edge of the neck ring 22 while covering a lower surface of the neck ring 22 provided on the lower end side of the mouth portion 2.

When the preform 1 is subjected to blow molding, the mouth portion 2 including the neck ring 22 is not stretched and serves as the mouth portion 20 of the container 10 as it is, and the distal end side of the covering layer 6 configured to cover the lower surface of the neck ring 22 is also left as it is. Accordingly, when the covering layer 6 provided in the preform 1 is formed as described above, the decorative layer 60 provided in the container 10 is similarly formed so that a distal end side of the decorative layer 60 reaches the peripheral end edge of the neck ring 22 while covering the lower surface of the neck ring 22 provided on a lower end side of the mouth portion 20.

With this, when the container 10 in which a content has been consumed is disposed of, the container main body 10a and the decorative layer 60 can be easily separated from each other by, for example, putting a finger on a distal end of the decorative layer 60 reaching the peripheral end edge of the neck ring 22 to separate a distal end side of the decorative layer 60 from the neck ring 22, and simultaneously pinching the separated distal end side with fingers and peeling off the decorative layer 60 from the container main body 10a.

Although not shown in particular, the decorative layer 60 can also be easily separated at the time of disposal by forming a perforation for cutting up through use of a $CO_2$ laser or the like.

In addition, the preform 1 may be produced by a so-called double mold molding method.

For example, through use of, as a common mold, a core mold for molding an inner surface side of the preform 1 (preform main body 1a) and an upper end surface of the mouth portion 2 and a mouth portion mold for molding an outer surface side of the mouth portion 2 including an upper surface and a peripheral end surface of the neck ring 22, and a primary mold for molding an outer surface side of the preform main body 1a extending from the lower surface of the neck ring 22 to the bottom portion 3, the preform main body 1a is subjected to injection molding. Then, through use of a secondary mold which is processed so that a gap corresponding to the thickness of the covering layer 6 is formed between the molded preform main body 1a and the secondary mold, and the distal end side of the covering layer 6 reaches the peripheral end edge of the neck ring 22 while covering the lower surface of the neck ring 22, the covering layer 6 is formed on an outer surface of the preform main body 1a by injection molding. In this manner, the preform 1 can be produced.

In this case, the preform main body 1a and the covering layer 6 can be each molded through use of any thermoplastic resin capable of being subjected to blow molding. However, in consideration of recyclability, it is preferred that the preform main body 1a be molded through use of ethylene terephthalate-based thermoplastic polyester, such as polyethylene terephthalate.

Meanwhile, it is preferred that the covering layer 6 be formed through use of a thermoplastic resin that is incompatible with a thermoplastic resin for forming the preform main body 1a. With this, in the container 10 obtained by subjecting the preform 1 to blow molding, the bonding strength (peel strength) between the container main body 10a and the decorative layer 60 may be appropriately adjusted depending on the degree of incompatibility so that the decorative layer 60 can be more easily peeled off from the container main body 10a.

In addition, when ethylene terephthalate-based thermoplastic polyester is used as the thermoplastic resin for forming the preform main body 1a, it is preferred to use, as the thermoplastic resin for forming the covering layer 6, for example, a polyolefin-based resin, such as polyethylene or polypropylene, an ethylene-vinyl alcohol copolymer, a polyamide-based resin, such as polymetaxylylene adipamide (MXD6), and the like. Through use of those resins, the shapeability of the decorative layer 60 can be improved.

In addition, a pigment, a colorant, or the like may be added to the thermoplastic resin for forming the covering layer 6 so that the decorative layer 60 is colored in a desired hue. Various additives may be added as required without being limited by the recyclability required in the container main body 10a.

Second Embodiment

Next, a second embodiment of the present invention is described.

Figure 4:
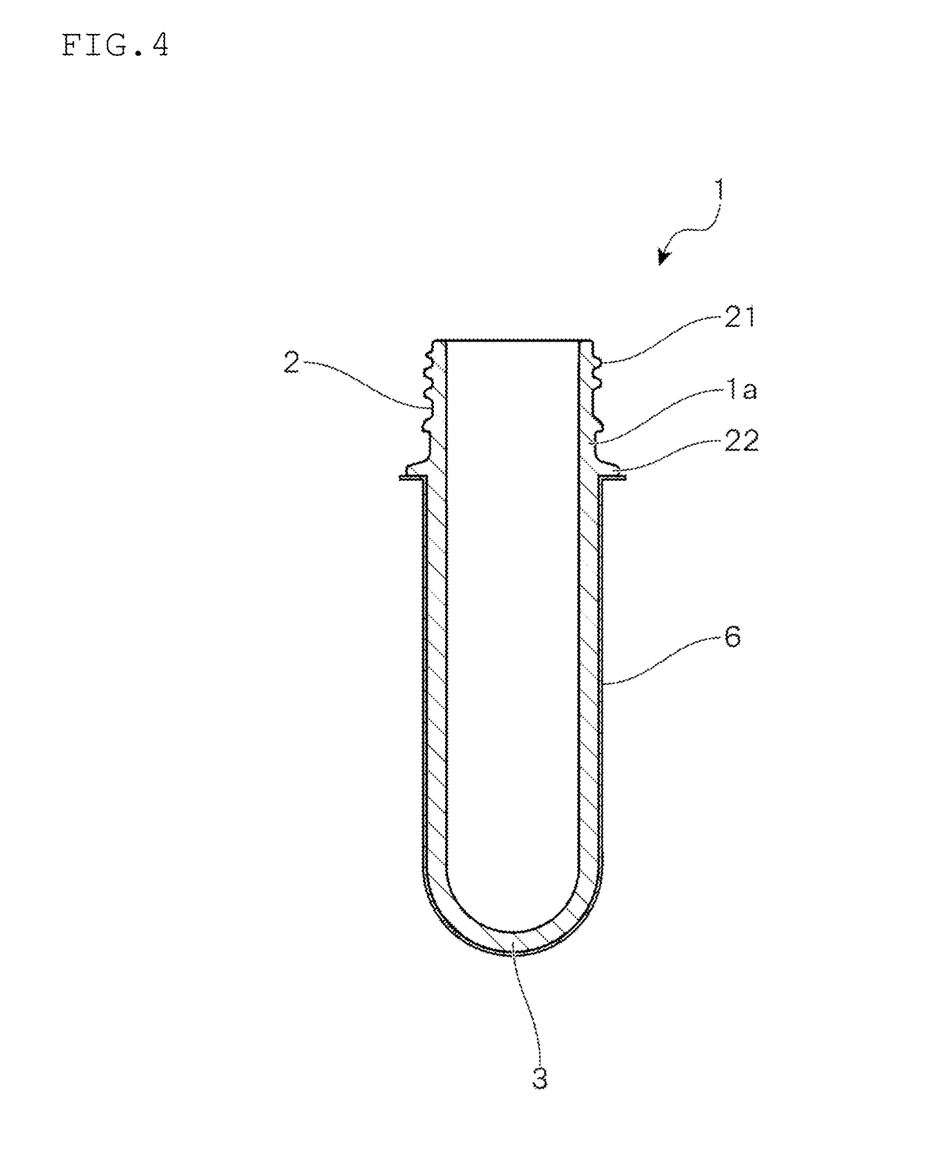
FIG. 4 is a vertical sectional view for schematically illustrating a preform according to a second embodiment of the present invention.
Figure 5:
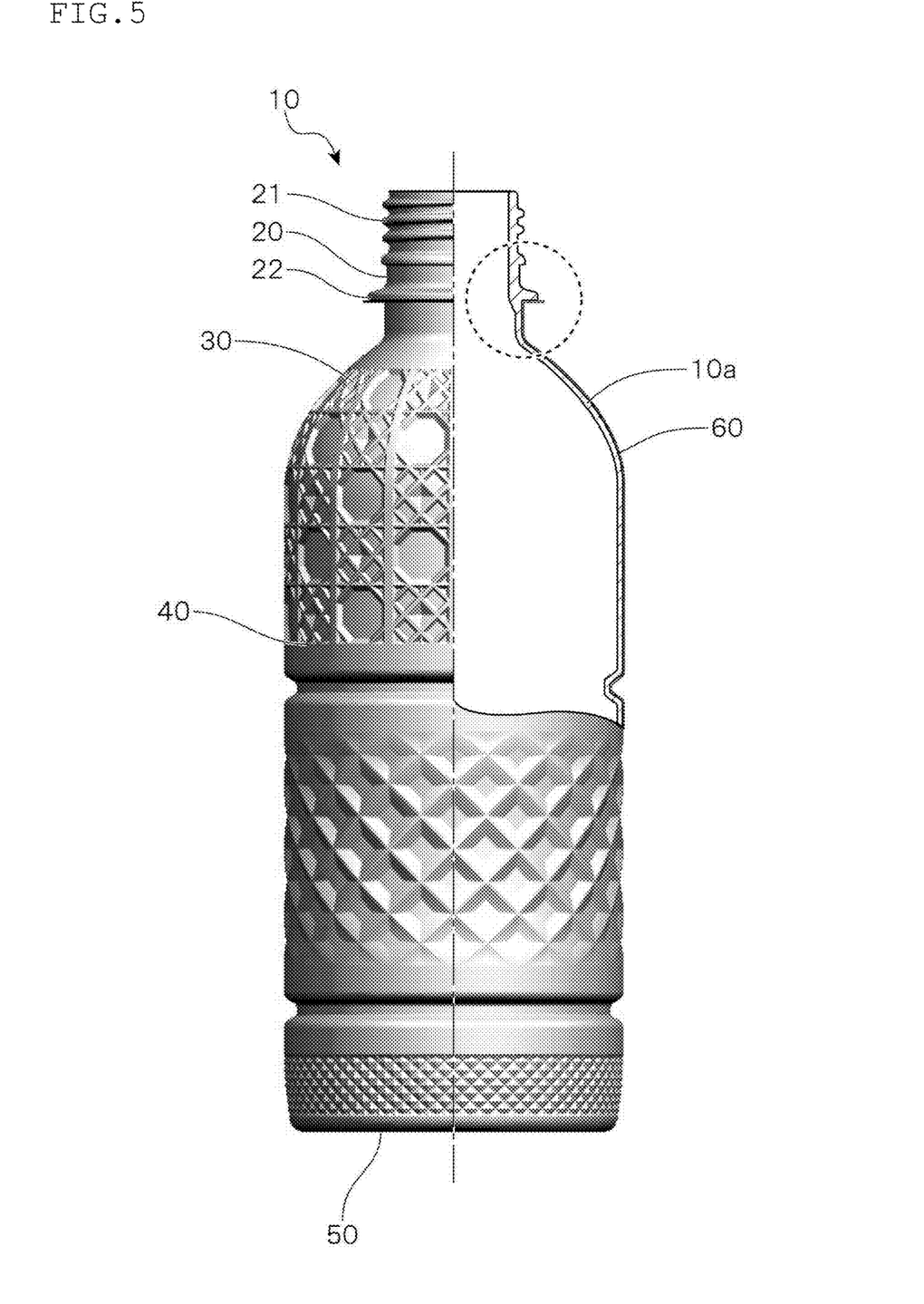
FIG. 5 is an explanatory view for schematically illustrating a synthetic resin container according to the second embodiment of the present invention.

FIG. 4 is a vertical sectional view for schematically illustrating a preform 1 according to the second embodiment. FIG. 5 is an explanatory view for illustrating an example of a synthetic resin container obtained by subjecting the preform 1 illustrated in FIG. 4 to blow molding under a state in which a part of the synthetic resin container is cut away. A range surrounded by the dashed line of FIG. 5 is illustrated in an enlarged state in FIG. 6.

In the first embodiment described above, the covering layer 6 provided in the preform 1 is formed so as to cover a region extending from a portion immediately below the mouth portion 2 to the bottom portion 3, and so that the distal end side of the covering layer 6 reaches the peripheral end edge of the neck ring 2 while covering the lower surface of the neck ring 22 provided on the lower end side of the mouth portion 2.

In contrast, the second embodiment is different from the first embodiment in that, in the covering layer 6 provided in the preform 1, at least a part of the distal end side of the covering layer 6 is formed so as to protrude from the peripheral end edge of the neck ring 22.

As described above, when the preform 1 is subjected to blow molding, the mouth portion 2 including the neck ring 22 is not stretched and serves as the mouth portion 20 of the container 10 as it is, and the distal end side of the covering layer 6 configured to cover the lower surface of the neck ring 22 is also left as it is.

Figure 6:
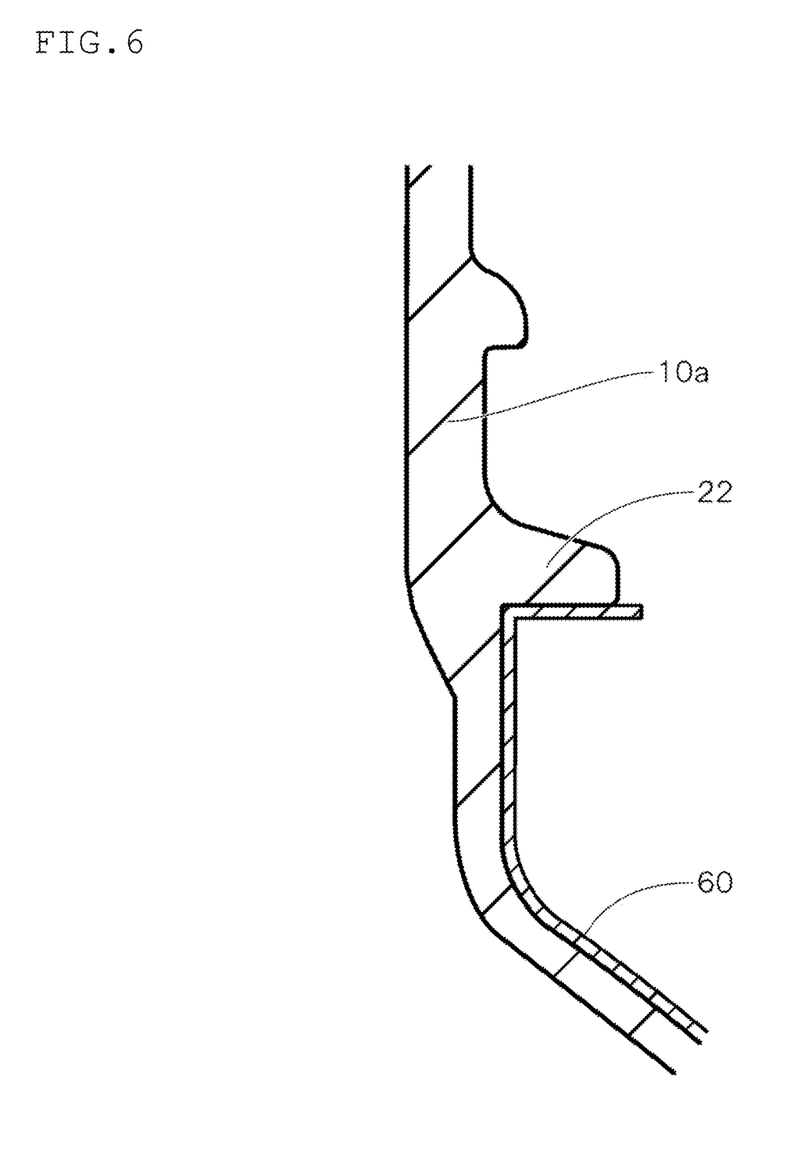
FIG. 6 is an enlarged sectional view of a main part for illustrating in an enlarged state a range surrounded by the dashed line of FIG. 5 with respect to the synthetic resin container according to the second embodiment of the present invention.

Accordingly, when the covering layer 6 provided in the preform 1 is formed as described above, the decorative layer 60 provided in the container 10 obtained by subjecting the preform 1 to blow molding is similarly formed so that at least a part of the distal end side of the decorative layer 60 protrudes from the peripheral end edge of the neck ring 22.

With this, when the container 10 in which a content has been consumed is disposed of, the container main body 10a and the decorative layer 60 can be easily separated from each other by pinching the distal end side of the decorative layer 60 protruding from the peripheral end edge of the neck ring 22 with fingers and peeling off the decorative layer 60 from the container main body 10a.

In the second embodiment, it is only required that the covering layer 6 (decorative layer 60) be formed so that at least a part of the distal end side of the covering layer 6 (decorative layer 60) protrudes from the peripheral end edge of the neck ring 22, and as in the illustrated example, the covering layer 6 (decorative layer 60) may also be formed so that the distal end side of the covering layer 6 (decorative layer 60) protrudes from the peripheral end edge of the neck ring 22 over the entire circumference.

In addition, when the distal end side of the covering layer 6 (decorative layer 60) is caused to protrude from the peripheral end edge of the neck ring 22, it is preferred to appropriately adjust the protruding length and the protruding range so that pinching the protruding region with fingers is not hindered while the protruding region is prevented from being accidentally caught by something to be damaged and the protruding region is prevented from being peeled off from the main body.

For example, in a quarter range in the circumferential direction of the neck ring 22, the covering layer 6 (decorative layer 60) may also be caused to protrude from the peripheral end edge by a length that is easy to pinch with fingers so that the protruding range is reduced.

In addition, when a perforation for cutting up is formed on the decorative layer 60 provided in the container 10 as described above, it is preferred that, when the preform 1 is produced, the covering layer 6 be caused to protrude from the peripheral end edge of the neck ring 22 at positions corresponding to positions at which perforations for cutting up are formed so that the perforations are formed in two rows in the vertical direction with a predetermined width and so that a region between the perforations protrudes from the peripheral end edge of the neck ring 22.

In addition, in the second embodiment, when the preform 1 is produced by the double mold molding method as described above, the preform 1 may be produced in the same manner except that the covering layer 6 is formed on the outer surface of the preform main body 1a by injection molding through use of a secondary mold which is processed so that a gap corresponding to the thickness of the covering layer 6 is formed between the molded preform main body 1a and the secondary mold, and at least a part of the distal end side of the covering layer 6 protrudes from the peripheral end edge of the neck ring of the preform main body 1a.

The second embodiment is different from the first embodiment in the above-mentioned point. However, the other configurations are the same as those of the first embodiment, and thus overlapping description is omitted.

Third Embodiment

Next, a third embodiment of the present invention is described.

Figure 7:
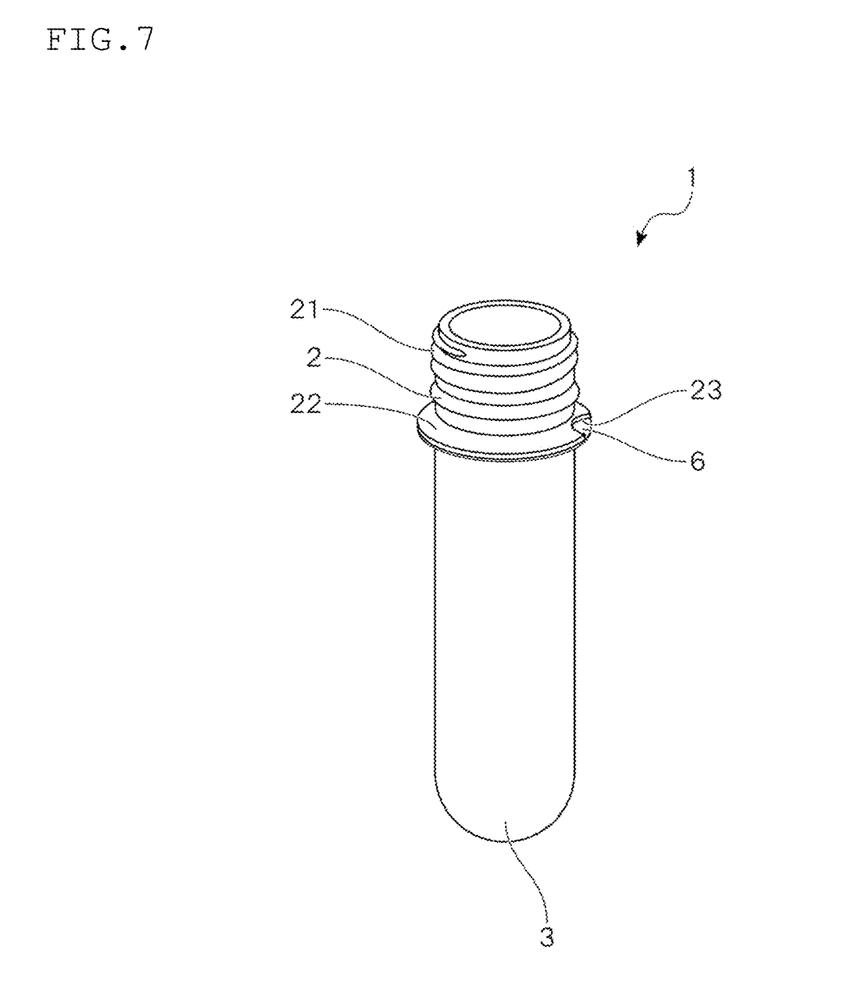
FIG. 7 is a perspective view for schematically illustrating a preform according to a third embodiment of the present invention.
Figure 8:
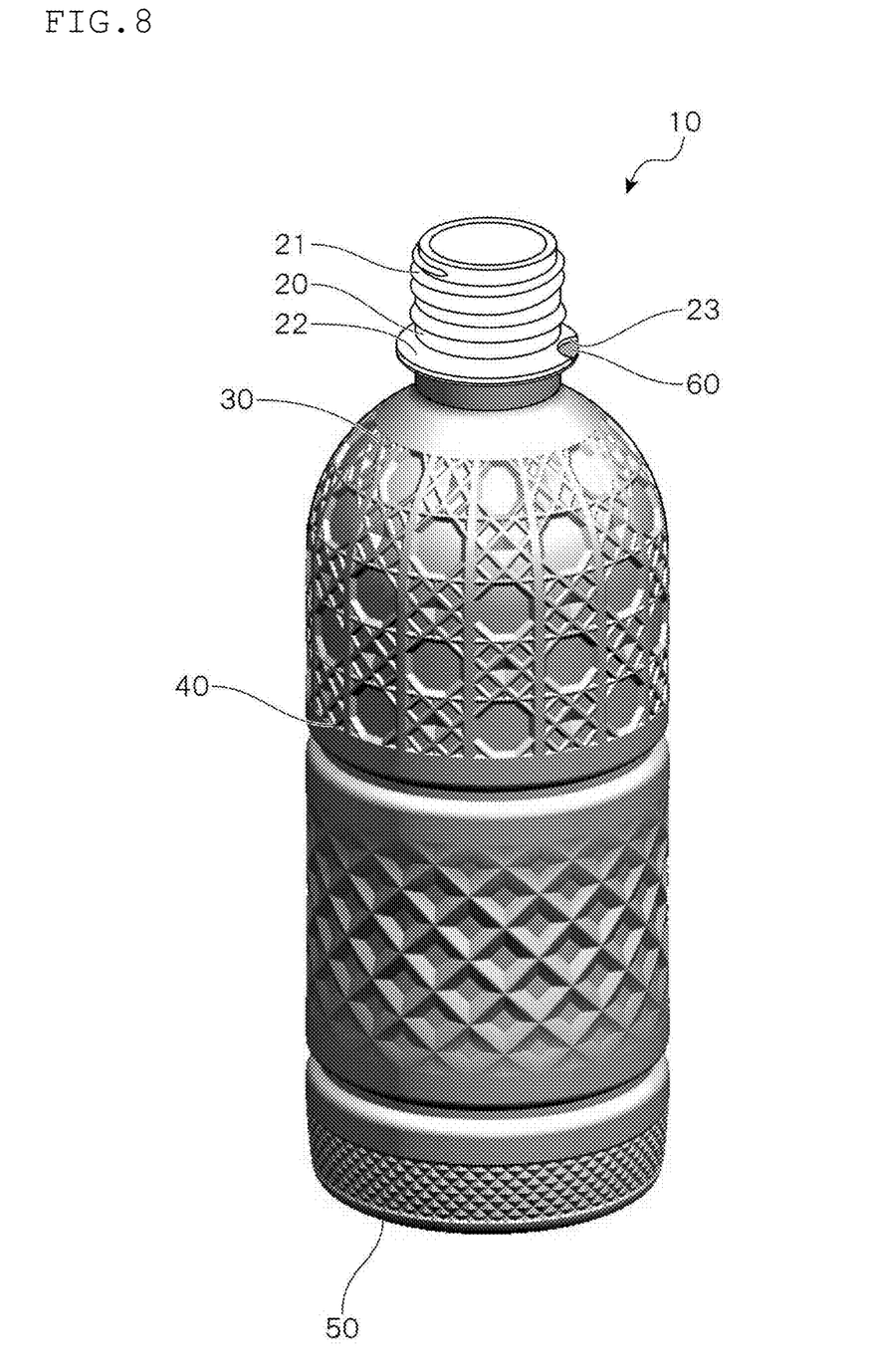
FIG. 8 is a perspective view for schematically illustrating a synthetic resin container according to the third embodiment of the present invention.

FIG. 7 is a perspective view for schematically illustrating a preform according to the third embodiment, and FIG. 8 is a perspective view for schematically illustrating an example of a synthetic resin container obtained by subjecting the preform 1 illustrated in FIG. 7 to blow molding.

The third embodiment is different from the first embodiment described above in that a cutout portion 23 configured to expose the covering layer 6 configured to cover the lower surface of the neck ring 22 is formed on a peripheral end edge side of the neck ring 22 of the preform 1.

As described above, when the preform 1 is subjected to blow molding, the mouth portion 2 including the neck ring 22 is not stretched and serves as the mouth portion 20 of the container 10 as it is.

Accordingly, when the neck ring 22 included in the preform 1 is provided as described above, the cutout portion 23 configured to expose the decorative layer 6 configured to cover the lower surface of the neck ring 22 is formed on the peripheral end edge side of the neck ring 22 also in the neck ring 22 included in the container 10.

With this, when the container 10 in which a content has been consumed is disposed of, the container main body 10a and the decorative layer 60 can be easily separated from each other by pinching the distal end side of the decorative layer 60 exposed from the cutout portion 23 formed in the neck ring 22 with fingers and peeling off the decorative layer 60 from the container main body 10a.

In the illustrated example, the cutout portion 23 is formed by cutting out the outer peripheral edge side of the neck ring 22 in a crescentic shape. However, there is no particular limitation on the shape of the cutout portion 23 formed in the neck ring 22 as long as the decorative layer 60 configured to cover the lower surface of the neck ring 22 is exposed and the distal end side of the decorative layer 60 can be pinched with fingers.

In addition, in the third embodiment, when the preform 1 is produced by the double mold molding method as described above, the preform 1 may be produced in the same manner except that the preform main body 1a is subjected to injection molding through use of a mouth portion mold which is processed so that the cutout portion 23 is formed in the neck ring 22 by forming a protruding portion at a position corresponding to the cutout portion 23 formed on the peripheral end edge side of the neck ring 22.

The third embodiment is different from the first embodiment in the above-mentioned point. However, the other configurations are the same as those of the first embodiment, and thus overlapping description is omitted.

As described above, according to the present embodiments, the uneven shape that is the same as and follows the uneven shape imparted to the surface of the container main body 10a appears on the surface of the decorative layer 60, with the result that the container 10 having three-dimensional design different from the conventional one can be provided.

In addition, in the container 10 of the present embodiments, when the container 10 in which a content has been consumed is disposed of, the decorative layer 60 can be easily peeled off from the container main body 10a through use of, as a starting point, the distal end side of the decorative layer 60 in the vicinity of the peripheral end edge of the neck ring 22, and the container main body 10a and the decorative layer 60 can be easily separated from each other.

The preferred embodiments of the present invention have been described above, but the present invention is not limited to the embodiments described above. Needless to say, various modifications may be made within the scope of the present invention.

For example, through combination of the above-described second embodiment and third embodiment, at least a part of the distal end side of the covering layer 6 may be formed so as to protrude from the peripheral end edge of the neck ring 22, and the neck ring 22 may have the cutout portion 23 configured to expose the covering layer configured to cover the lower surface of the neck ring 22 on the peripheral end edge side of the neck ring 22.

The documents described in the specification and the specification of Japanese application on the basis of which the present application claims Paris convention priority are incorporated herein by reference in its entirety.

REFERENCE SIGNS LIST 1 preform
1a preform main body
2 mouth portion
3 bottom portion
6 covering layer
10 synthetic resin container
10a container main body
20 mouth portion
21 screw thread
22 neck ring
23 cutout portion
30 shoulder portion
40 body portion
50 bottom portion
60 decorative layer

The invention claimed is:

1. A preform for manufacturing a synthetic resin container by blow molding, the preform comprising:
    a preform main body of a bottomed cylindrical shape that is opened to have a mouth portion on one end side thereof; and
    a covering layer configured to cover the preform main body except for a part thereof on a mouth portion side,
    wherein the covering layer covers a lower surface of a neck ring that is provided on a lower end side of the mouth portion and protrudes annularly along a circumferential direction;
    at least a part of a distal end side of the covering layer protrudes from a peripheral end edge of the neck ring; and
    the covering layer does not extend above the lower surface of the neck ring.

2. The preform according to claim 1, wherein the covering layer is formed through use of a thermoplastic resin that is incompatible with a thermoplastic resin for forming the preform main body.

3. A synthetic resin container, which is obtained by subjecting the preform of claim 1 to blow molding,
    the synthetic resin container comprising a decorative layer having, imparted thereto, an uneven shape that is the same as and follows an uneven shape imparted to a surface of a container main body,
    wherein the decorative layer covers a lower surface of a neck ring that is provided on a lower end side of a mouth portion of the synthetic resin container and protrudes annularly along a circumferential direction;

at least a part of a distal end side of the decorative layer protrudes from a peripheral end edge of the neck ring; and the decorative layer does not extend above the lower surface of the neck ring.

4. The preform according to claim 1, wherein any portion of the covering layer does not cover an upper surface of the neck ring.

5. A preform for manufacturing a synthetic resin container by blow molding, the preform comprising:
- a preform main body of a bottomed cylindrical shape that is opened to have a mouth portion on one end side thereof; and
- a covering layer configured to cover the preform main body except for a part thereof on a mouth portion side, wherein the covering layer covers a lower surface of a neck ring that is provided on a lower end side of the mouth portion and protrudes annularly along a circumferential direction, and the neck ring has, on a peripheral end edge side thereof, a cutout portion cutting through an upper surface and the lower surface of the neck ring, thereby exposing the covering layer configured to cover the lower surface of the neck ring.

6. A synthetic resin container, which is obtained by subjecting the preform of claim 5 to blow molding,
the synthetic resin container comprising a decorative layer having, imparted thereto, an uneven shape that is the same as and follows an uneven shape imparted to a surface of a container main body, wherein the decorative layer covers a lower surface of a neck ring that is provided on a lower end side of a mouth portion of the synthetic resin container and protrudes annularly along the circumferential direction.

7. The preform according to claim 5, wherein the covering layer is formed through use of a thermoplastic resin that is incompatible with a thermoplastic resin for forming the preform main body.

8. The preform according to claim 5, wherein any portion of the decorative layer does not cover an upper surface of the neck ring.

* * * * *